(12) United States Patent
Long

(10) Patent No.: US 6,378,551 B1
(45) Date of Patent: Apr. 30, 2002

(54) LANTERN WITH IMPROVED CHOKE AND REGULATOR

(75) Inventor: Richard Long, Wichita, KS (US)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 09/525,284

(22) Filed: Mar. 15, 2000

(51) Int. Cl.[7] .............................................. G05D 16/06
(52) U.S. Cl. .............. 137/495; 137/505.25; 137/505.42
(58) Field of Search ................................. 137/495, 505, 137/505.25, 505.42

(56) References Cited

U.S. PATENT DOCUMENTS

| | | | | |
|---|---|---|---|---|
| 47,362 A | * | 4/1865 | Mallerd | 137/495 |
| 219,989 A | * | 9/1879 | Sleeman | 137/495 |
| 543,448 A | * | 7/1895 | Lowe | 137/495 |
| 718,592 A | * | 1/1903 | Zander | 137/495 |
| 2,895,640 A | * | 7/1959 | Becker et al. | 137/495 |
| 3,941,554 A | | 3/1976 | Curtis | |
| 4,099,538 A | | 7/1978 | Curtis | |
| 4,186,760 A | | 2/1980 | Hastings | |
| 4,522,582 A | | 6/1985 | Curtis | |
| 4,870,314 A | | 9/1989 | Hefling | |
| 5,803,727 A | | 9/1998 | Long | |
| 5,902,100 A | | 5/1999 | Long | |

OTHER PUBLICATIONS

Markill Stove Astro Lantern #69210 catalog page, Jun. 13, 2000.

* cited by examiner

Primary Examiner—Stephen M. Hepperle
(74) Attorney, Agent, or Firm—Kramer Levin Naftalis & Frankel LLP

(57) ABSTRACT

A gas operated lantern includes a regulator having a simple mechanism allowing a user to start or stop the flow of gas through the regulator. The regulator preferably exhausts an air/gas mixture in the same direction as which gas enters the regulator. The regulator includes a diaphragm assembly which presses down on a valve assembly to open the valve assembly. A stem enters the regulator and is turnable by the user to raise the diaphragm assembly and thus cause the valve assembly to close. The lantern also includes an automatic choke. The choke is preferably a strip of metal located in the burner tube of the lantern which acts to close off a portion of the burner tube when the lantern is cold, causing the air/fuel mixture to become richer and thus easier to light. As the lantern heats up, the choke straightens to open the burner tube, allowing a greater flow of air through the lantern and causing the air/fuel mixture to become leaner and thus raising the efficiency of the lantern.

5 Claims, 5 Drawing Sheets

LANTERN WITH IMPROVED CHOKE AND REGULATOR

FIELD OF THE INVENTION

The present invention relates to gas burning lanterns. In particular, the present invention relates to a gas burning lantern with an improved regulator and an improved choke.

BACKGROUND INFORMATION

A conventional gas burning lantern typically comprises a refillable fuel storage tank, fuel delivery apparatus, and a burner attached to the fuel delivery apparatus. The fuel delivery apparatus may include a regulator and other equipment, such as a operator gas flow controller. The burner typically comprises a mantle which, when ignited with a fuel/air mixture provided by the fuel delivery apparatus, emits a bright light. The mantle in such a lantern contains a catalyst, such as yttrium-oxide, which converts the heat from the flame into light. The burner is covered by a transparent glass globe. Fuel typically used with such lanterns includes liquid propane or butane.

The regulator in such a lantern accepts gas from a gas source and provides a steady, controlled gas stream as an output. The regulator or another mechanism mixes air with the gas flow to produce an air/gas mixture. Typically a valve allowing gas to flow through the regulator is closed or narrowed as gas pushes against a diaphragm assembly in the regulator. The narrowing of the valve lowers the gas flow through the regulator, lowering the pressure on the diaphragm and thus allowing the valve to open somewhat. Quickly an equilibrium is established where the diaphragm accepts a certain amount of gas pressure and in turn allows the valve to open a certain amount. A regulator may have a control mechanism allowing a user to stop the flow of gas through the regulator in order to turn the lantern on or off. Such mechanisms engage the diaphragm assembly or another portion of the regulator to open or close the valve in the regulator.

A typical regulator allows gas to enter through a passage and then to leave the regulator through a passage which is more or less at a 90 degree angle from the entry passage. Thus, typically, gas does not exit the regulator travelling in the same direction as which it entered (for example, entering the regulator through the bottom and leaving through the top), as the diaphragm assembly provides a barrier around which gas cannot flow. To allow for a better arrangement of components, it is desirable to have gas exit the regulator in the same direction which it entered.

Some regulator designs allow gas to flow straight through the regulator, in the same direction which the gas enters, by including a tube or opening through the regulator assembly. Gas then may flow up through the regulator. However, such regulators either lack control mechanisms allowing the user to regulate the flow of gas or include awkward control mechanisms. For example, an arm may connect to the diaphragm assembly to allow a user to turn the flow of gas on or off. The arm extends out of the regulator and out of the lantern, and swings in a semi-circle as it is turned around the side of the lantern. Such a design has a large profile and is awkward, as the swing of the arm takes up too much space. Other designs have control mechanisms separate from a diaphragm assembly or separate from a regulator. Such extra equipment adds to the complexity and expense of the lantern.

The mantle in a typical lantern is most efficient at producing light when operating at relatively high temperatures. The lantern flame burns hotter with leaner air/gas mixtures; i.e., with higher air/gas ratios. However, leaner gas mixtures are harder to light, particularly when a lantern is cold, and particularly if an automatic lighting mechanism is used rather than an open flame from a match. A richer air/gas mixture allows for easier lighting, but is less efficient.

The air/fuel mixture may actually get richer after the lantern heats up. The amount of gas flowing from the lantern's gas tank to the mantle typically remains constant over various operating conditions. However, the amount of air entering the system to mix with the gas is affected by the pressure in the system. A flame operating in a hot lantern may cause back pressure through the system, lowering the amount of air entering the lantern and creating a richer mixture.

Current designs attempt to solve the problem of providing a lantern which is both efficient and easy to light in various manners. Certain lanterns set the air/gas mixture at an intermediate level which allows relatively easy lighting but which also allows for reasonable efficiency. Such a solution is imperfect, as the lantern is neither optimally efficient nor optimally easy to light. Other lanterns include a user operated choke which allows a user to alter the air/gas mixture so that it is rich on lighting and lean during operation. Such a solution is imperfect, in that it requires extra equipment and user operation. The extra equipment adds expense and eventually may wear out.

It would be desirable to have a regulator which allows gas to exit the regulator in the same direction which it enters (e.g., through the top of the regulator) and in addition which has a simple, easy to use, low profile, low cost, integral mechanism for allowing a user to control the flow of gas through the regulator. It would be desirable to have an automatic choke in a gas lantern which is simple and reliable.

SUMMARY OF THE INVENTION

The gas operated lantern of the present invention includes a regulator having a simple mechanism allowing a user to start or stop the flow of gas through the regulator. The regulator controls the flow of gas through the lantern, and preferably exhausts an air/gas mixture out of the regulator in the same direction as which gas enters the regulator. The regulator includes a diaphragm assembly which presses down on a valve assembly to open the valve assembly. A stem enters the regulator and is turnable by the user to raise the diaphragm assembly and thus cause the valve assembly to close. Such a method of allowing the user to control the flow of gas through the regulator is simple, less awkward and less expensive than existing designs.

The lantern also includes an automatic choke which is reliable, will not wear out, and which is simple and inexpensive. The choke is preferably a strip of metal located in the burner tube of the lantern which acts to close off a portion of the burner tube when the lantern is cold, causing the air/fuel mixture to become richer and thus easier to light. As the lantern heats up, the choke straightens to open the burner tube, allowing a greater flow of air through the lantern and causing the air/fuel mixture to become leaner and thus raising the efficiency of the lantern.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well known features are omitted or simplified in order not to obscure the present invention.

Figure 1:
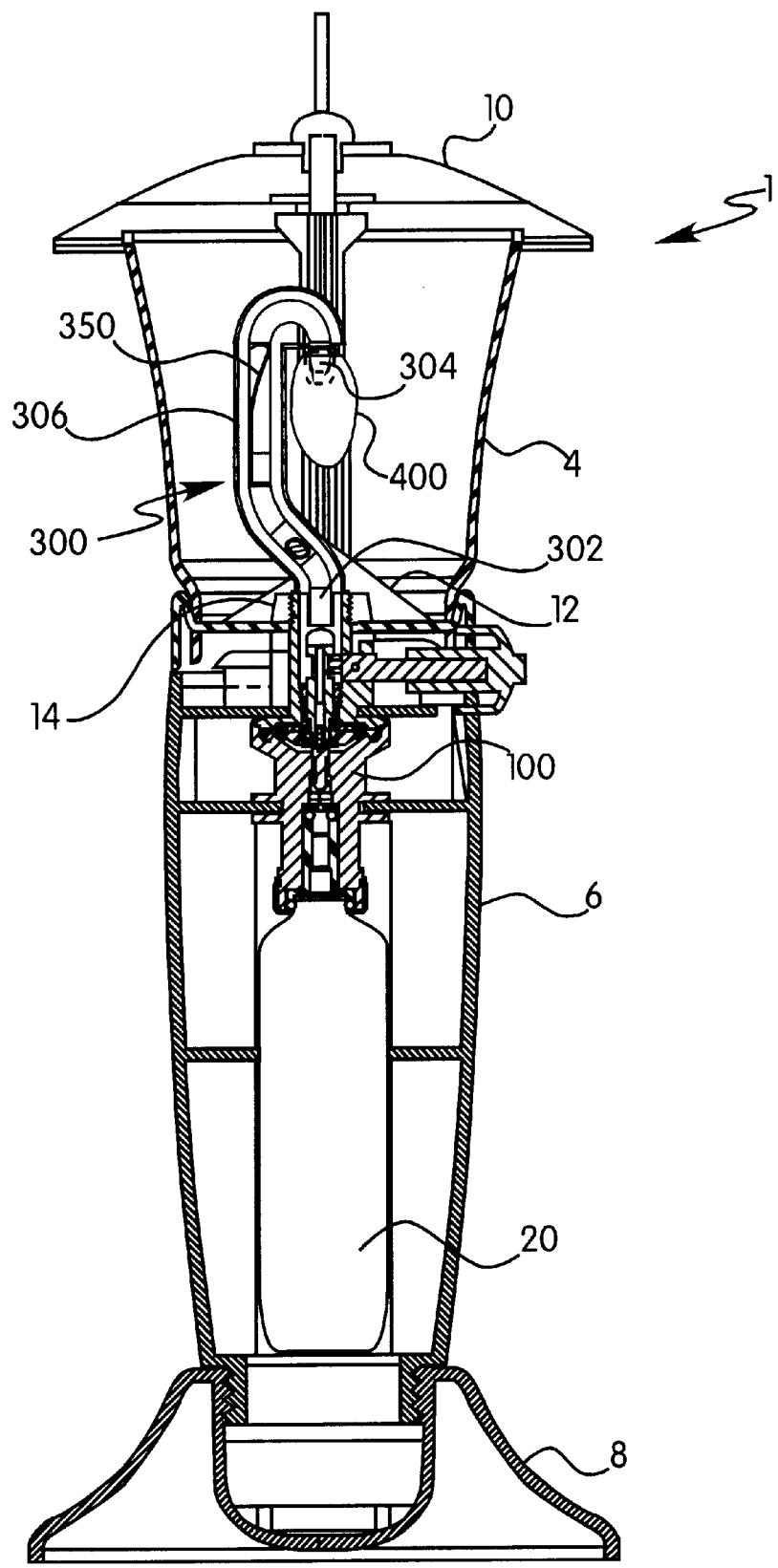
FIG. 1 illustrates a lantern according to an exemplary embodiment of the present invention.

FIG. 1 illustrates a lantern according to an exemplary embodiment of the present invention. The lantern 1 includes a regulator assembly 100, which provides a controlled flow of fuel from a fuel tank 20, mixes primary air with fuel, and which is connected to and provides an air/fuel mixture to a burner tube 300. The fuel tank 20 may be of known construction and connects to the regulator assembly 100 through known methods. The burner tube 300 includes a lower opening 302 and an upper opening 304. The lantern 1 includes a preferably transparent glass globe 4 which encloses the burner tube 300. The burner tube 300 is attached to and provides a gas/air mixture to a mantle 400, which glows to provide light when the lantern 1 is lit. The air/fuel mixture flows through the burner tube 300 and is combusted at the mantle 400, which glows to provide light. The mantle 400 is implemented in a known way, such as a fabric impregnated with yttrium oxide. A ventilator cap 10 is arranged at the top of the lantern 1, above the globe 4. The globe 4 and burner sub-assembly are arranged on a housing 6 which houses fuel storage and delivery sub-systems, described more fully below, and which includes a base 8.

The burner tube 300 is inserted into a bushing 14 which is inserted into the output of the regulator. The bushing 14, which is preferably comprised of a plastic material, serves to support the burner tube 300 while thermally insulating the burner tube 300 from the regulator assembly 100, thereby minimizing heat transfer from the burner tube 300 to the regulator assembly 100. The burner tube 300 can readily be detached from the regulator assembly 100 by pulling it out of the bushing 14.

The mantle 400 is attached to the burner tube 300 in a known way, such as by tying the mantle 400 to a mantle holder (not shown) on the upper opening 304 of the burner tube 300 with a thread sewn around the opening of the mantle 400. The upper opening 304 is a burner tube outlet which provides an air/gas mixture to the mantle 400.

The burner tube 300 includes a choke 350, which functions to increase (richen) the fuel/air ratio reaching the mantle 400 during lighting and to decrease this ratio, making the mixture leaner, during normal operation. The burner tube 300 is bent in three places so that one length 306 of the burner tube 300 is substantially parallel to the mantle 400, allowing the burner tube 300, the air/gas mixture in the burner tube 300, and the choke 350 to absorb heat from the mantle 400. The mantle 400 becomes very hot when lit (e.g., 2000–2500 F.).

A reflector 12, which is preferably comprised of stainless steel and has a substantially conical shape is arranged at the base of the globe 4 and substantially surrounds the lower end of the burner tube 300. The reflector 12 redirects light that is cast downward from the mantle 400—light that would otherwise be lost—outward from the lantern 1, thereby providing more useful light (e.g., 10% more) to the lantern user. Additionally, the reflector 12 acts to shield the regulator from dangerously hot gases which may be emitted by the mantle 400.

In an exemplary embodiment an automatic lighting mechanism (not shown) is used to apply a flame or spark to the area near the mantle 400 to light the lantern 1. Alternately, the ventilator cap 10 may include a lighting hole allowing a lit match to be inserted to light the lantern 1.

In an alternate embodiment, the lantern according to an embodiment may be of a different configuration and may contain different components. For example, no regulator may be included, or a manual choke may be included.

I. Regulator

Figure 2A:
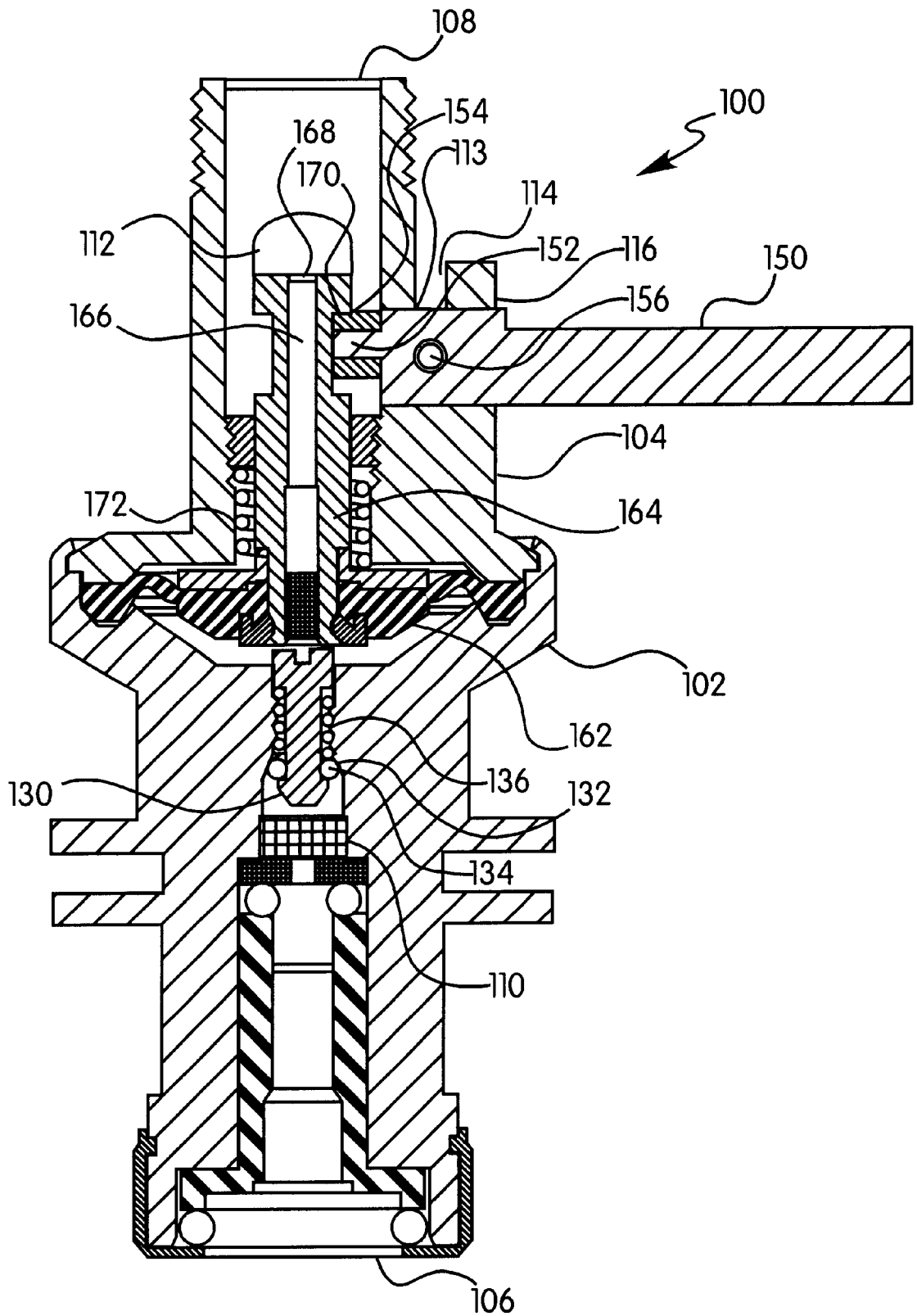
FIG. 2a illustrates the regulator assembly of FIG. 1 according to an exemplary embodiment of the present invention.

FIG. 2a illustrates the regulator assembly of FIG. 1 according to an exemplary embodiment of the present invention. The regulator assembly 100 acts to control the flow of gas and provide a constant flow of gas from the fuel tank 20 to the burner tube 300. The regulator assembly 100 includes a regulator body 102, a regulator top 104, a regulator input 106 and a regulator output 108. Gas enters the regulator input 106 and an air/gas mixture flows out of the regulator output 108. A filter 110 may be located near the bottom of the regulator assembly 100. One or more air openings 112 allow air to enter the regulator assembly 100 and to mix with gas. In an exemplary embodiment, air openings 112 include two round openings each having a diameter of approximately 0.18 inch. In FIG. 2a, only one of the air openings 112 is visible.

In an exemplary embodiment, the regulator assembly 100 includes a valve spool 130, seated in a valve spool opening 132, which provides a variable flow opening by opening and closing against an O-ring 134, also seated in the valve spool opening 132, to control the amount of gas flowing through the regulator assembly 100. The valve spool opening 132 is narrowed, possibly to the point of closing, as a valve spool spring 136 pushes the valve spool 130 against the O-ring 134, sealing or partially closing the valve spool opening 132. The valve spool opening 132 may be narrowed in varying amounts, including to the point where the valve spool opening 132 is completely closed. The valve spool opening 132 is a valve opening, the width of which may be varied by using a valve stop (the valve spool 130), varying the flow therethrough. The valve spool opening 132 is opened or widened as a diaphragm assembly 160 pushes down on the valve spool 130. The diaphragm assembly 160 includes a preferably elastomer or rubber diaphragm 162, connected to a neck 164. A diaphragm spring 172 pushes against the regulator top 104 to press down on the diaphragm 162 and neck 164. The neck 164 of the diaphragm assembly 160 in turn presses down on the valve spool 130 to open or widen the valve spool opening 132. The neck 164 includes a neck passage 166, which is an axial fluid channel extending through the neck 164, with a gas tip 168 at its top. Gas flows through the neck passage 166 and exits through the gas tip 168. The gas tip 168 is a small hole, preferably approximately 3/1000 inch in diameter, which provides back pressure to the system, limits the amount of gas flowing through the regulator assembly 100, and provides velocity to the gas exiting the neck passage 166. Preferably gas leaves the gas tip 168 at approximately 15 PSI.

In FIG. 2a, the valve spool opening 132 is shown in the closed condition, and the regulator assembly 100 does not allow gas to pass through. In an alternate embodiment, a different method may be used to open or widen and close or narrow a valve; for example, a structure integral with the diaphragm assembly may be used. In further embodiments the diaphragm assembly may be of different structures and include different components.

The regulator assembly 100 includes a valve stem 150 extending from the interior of the regulator assembly 100, through a valve hole 113. Preferably, the stem 150 extends from the side of the regulator assembly 100. A user may turn the valve stem 150 to control the flow of gas through the regulator assembly 100.

The valve stem 150 includes a cam 152. A bushing or bearing 154 is rotatably mounted on the cam 152. The cam 152 and bearing 154 are off center relative to the axis of the valve stem 150, and engage a rim or lip 170 on the neck 164 to move the diaphragm assembly 160 and control the gas flow. The cam 152 is an axially off center extension or boss, located on the stem 150, which may be formed, for example by being machined and/or cast, or by other methods. The bearing 154 reduces the side load on the lip 170 of the valve stem 150 as the valve stem 150 is rotated and allows the stem 150 to be more easily turned against the lip 170 of the neck 164.

The valve stem 150 is held in place by a roll pin 156 extending out of the valve stem 150 and sliding in a groove 114 defined by an extension 116, which extends from the regulator top 104, and the body of the regulator top 104. The roll pin 156 also functions to keep the range of rotation of the valve stem to a certain range, for example 180 degrees. In alternate embodiments, the structure which engages the valve stem may differ; for example, an extending flange may be used. In further embodiments the valve stem may be of a different structure; for example a knob or lever may cause a structure such as a cam, extension or bushing to engage and move a diaphragm assembly.

Figure 2B:
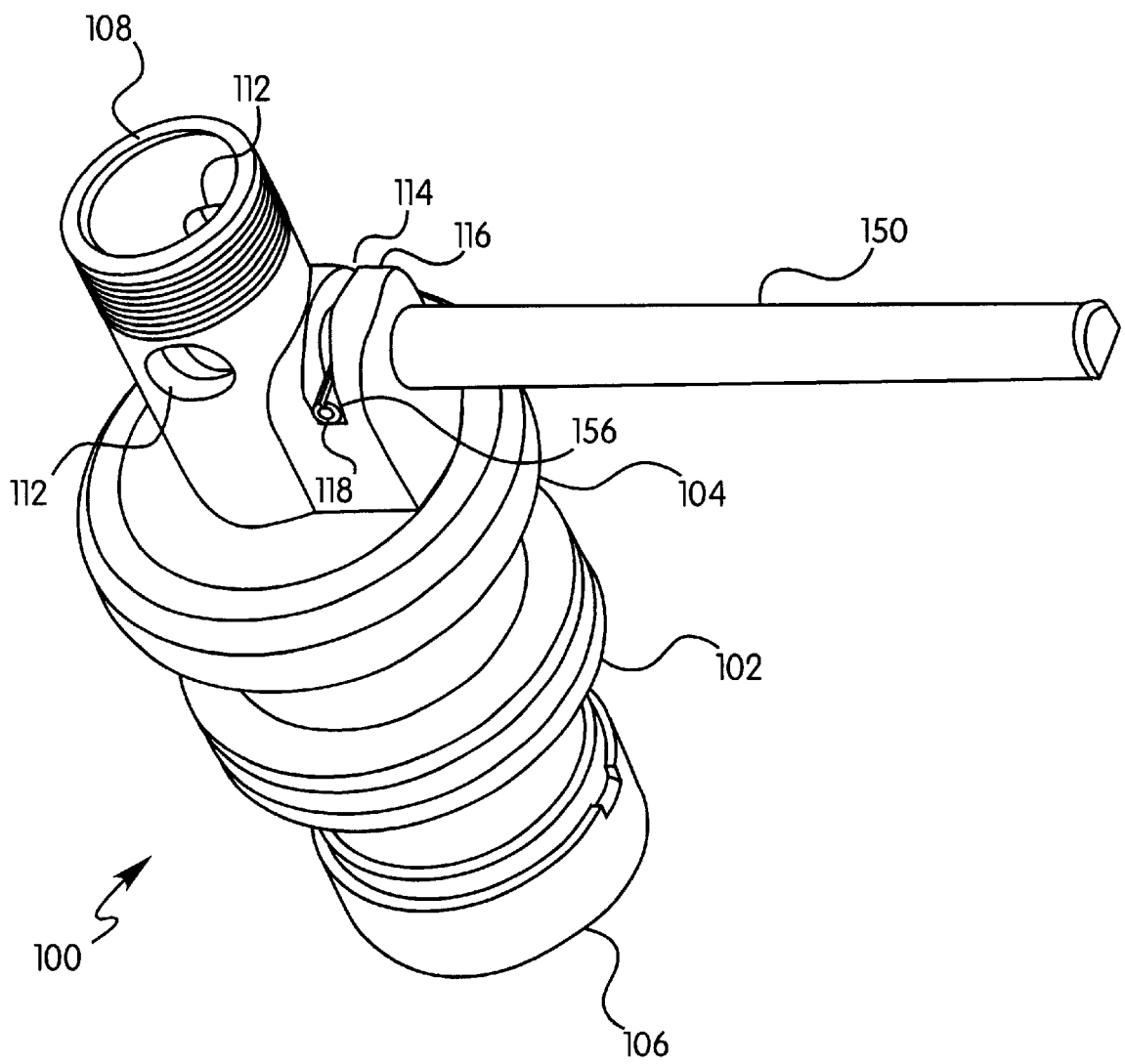
FIG. 2b is a perspective view illustrating the regulator assembly of FIG. 1 according to an exemplary embodiment of the present invention.

FIG. 2b is a perspective view illustrating the regulator assembly of FIG. 1 according to an exemplary embodiment of the present invention. The regulator assembly 100 includes the regulator body 102, the regulator top 104, the regulator input 106, the regulator output 108, and air openings 112. The valve stem 150 is held in place by the roll pin 156 extending out of the valve stem 150 and sliding in the groove 114, defined by the extension 116 and the regulator top 104. The roll pin 156 functions to limit the range of rotation of the valve stem by moving between a groove stop 118 and an opposite groove stop (not shown) on the other side of the groove 114. In alternate embodiments the valve stem may be of a different structure. For example, the roll pin may not be required, and the valve stem may be held in place by different structures.

Referring to FIG. 2a, when a user turns the stem 150 to a certain position, the cam 152 and bearing 154 push up on the lip 170, causing the neck 164 and the diaphragm assembly 160 to rise and causing the valve spool opening 132 to be closed by the valve spool 130. In such a manner, a user may cause the regulator assembly 100 to close, and to stop allowing gas therethrough. The user may thus turn off the flow of gas through the lantern 1. When a user turns the stem 150 to a different position, the cam 152 and bearing 154 allow the neck 164 and thus the diaphragm assembly 160 to fall, allowing the valve spool opening 132 to be opened.

Preferably, in such a position the cam 152 and bearing 154 do not interfere with the normal operation of the regulator assembly 100.

In an alternate embodiment, the regulator assembly may have a different structure and a different set of components. For example, the regulator body may be of one integral piece, or the bushing may be eliminated.

That the stem 150 is located to the side of the regulator assembly 100 allows the regulator assembly 100 to expel gas in a direction continuous with the direction which the gas enters the regulator assembly 100; e.g., gas may enter from the bottom of the regulator assembly 100 and an air/gas mixture may exit the top. The stem 150 turns axially, thus avoiding a large, awkward sweep of motion that a movable handle may have. That the stem 150 is integral with the regulator assembly 100 and uses the diaphragm 162 as part of the on/off mechanism simplifies the overall mechanism and lowers the cost of the regulator assembly 100. In an alternate embodiment, the stem of the present invention may be used with a regulator expelling gas at another angle relative to the gas input; for example 90 degrees.

In operation, gas flows from the fuel tank 20 (FIG. 1) and in through the regulator input 106. Initially, when no gas flow is established, the diaphragm assembly 160 presses down on the valve spool 130, opening the valve spool opening 132. Gas flows through the valve spool opening 132, through the neck passage 166, and out of the gas tip 168. Air flows in through the air openings 112 to mix with the gas, and the air/gas mixture flows out of the regulator output 108. The air and gas may not be fully mixed as it leaves the regulator output 108.

As gas flows through the valve spool opening 132 it presses up against the diaphragm 162. The upward pressure on the diaphragm 162 counteracts the force of the diaphragm spring 172 and allows the diaphragm 162 to lift, easing the pressure of the diaphragm assembly 160 on the valve spool 130. The valve spool spring 136 closes the valve spool 130 to an extent, lowering the flow of gas through the regulator assembly 100, lowering the pressure on the diaphragm 162, and raising, in turn, the pressure of the diaphragm assembly 160 on the valve spool 130. This causes the valve spool opening 132 to be opened slightly. After a possible initial oscillation, the system quickly reaches equilibrium. The diaphragm 162 accepts a certain amount of gas pressure and transmits this pressure to the diaphragm spring 172. The diaphragm assembly 160 presses on the valve spool 130 to keep the valve spool opening 132 open a certain amount.

If a user wishes to turn off the lantern 1 by stopping the flow of gas through the regulator assembly 100, the user turns the valve stem 150. The cam 152 and bearing 154 engage the lip 170 on the neck 164 and lift the neck 164, causing the diaphragm assembly 160 to stop pressing down on the valve spool 130 and thus causing the valve spool 130 to close the valve spool opening 132. When the user rotates the stem 150 in the opposite direction, the cam 152 and bearing 154 move and disengage with the neck 164, allowing the diaphragm assembly 160 to fall and thus allowing the valve spool opening 132 to be opened.

In an exemplary embodiment, the diaphragm 162 and O-ring 134 are constructed of elastomer or rubber. The regulator body 102 and the regulator top 104 may be constructed of zinc. Other parts, such as the stem 150 or neck 164, may be constructed of a metal such as brass. The various springs may be constructed of music wire. Alternately, the materials used may be different. For example, other metals may be used, or plastics may be used, as appropriate.

II. Automatic Choke

Figure 3A:
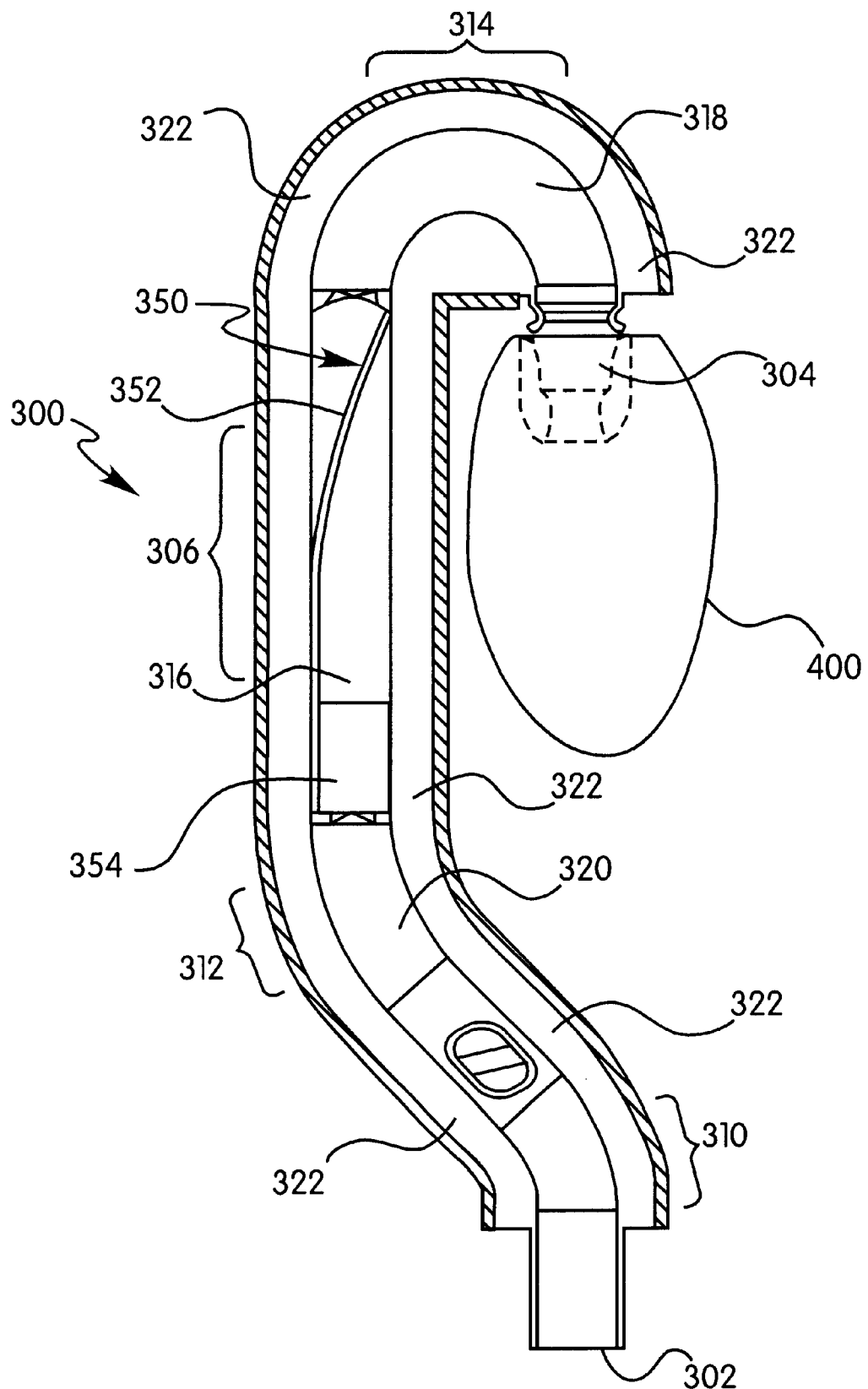
FIG. 3a illustrates the burner tube of FIG. 1 according to an exemplary embodiment of the present invention.

FIG. 3a illustrates the burner tube of FIG. 1 according to an exemplary embodiment of the present invention. The burner tube 300 includes a lower opening 302 and an upper opening 304. A mantle 400 is attached to the upper opening 304. The burner tube 300 includes a choke 350, functioning to richen the air/fuel mixture flowing through the burner tube 300 on startup and to make the mixture lean after the lantern 1 is lit. The choke includes a main bending portion 352, which acts to vary the extent to which the passageway through the burner tube 300 is open, and which is held in place by two wings 354 and 356; only wing 354 is visible in FIG. 3a.

The burner tube 300 includes bends 310, 312 and 314. The bends 310–314 help define a relatively straight length 306, in which the choke 350 is located. The bends 310–314 in the burner tube 300 position the flame at the mantle 400 alongside the burner tube 300, heating the burner tube 300 to a temperature of approximately 400 degrees Fahrenheit. This heats the air/fuel mixture flowing through the burner tube 300 before burning, increasing efficiency, and also transfers heat to the choke 350, causing the choke 350 to make the air/fuel mixture lean for normal operation. In an exemplary embodiment, the flame is positioned approximately one quarter inch from the length 306 of the burner tube 300. However, other distances may be used depending on, inter alia, the operational heat of the flame and the structure of the choke or burner tube.

The choke 350 preferably is a slightly bent or curved bi-metallic strip which straightens in response to heat generated by the lantern 1 to open the channel within the burner tube 300 and thus make the air/fuel mixture at the mantle 400 leaner, increasing efficiency. In an alternate embodiment, the burner tube may be of another shape. In further embodiments, the choke may bend in response to heat to alter the air/gas ratio.

In an exemplary embodiment, the burner tube 300 is a hollow tube which has a section 316 with a substantially rectangular cross section which accommodates the choke 350, and two sections 318 and 320 each having a substantially round cross section. When used herein, rectangular may include square. The burner tube 300 is manufactured from two pieces of sheet metal with flat edges and rounded inner sections. When the two pieces are joined the rounded inner sections form the tubular sections 316–320 and the flat edges form a flat portion or flange 322 extending from the sides of the burner tube 300. The flange 322, formed by the joining of the flat portions of the pieces of sheet metal, serves to hold the burner tube 300 together. In an alternate embodiment, the burner tube 300 may be of another structure; for example, the burner tube 300 may be one piece. In a further embodiment, the burner tube may have a uniformly shaped cross section. For example, the entire section may be square or round.

In an exemplary embodiment, the bi-metallic nature of the choke 350 causes it to be slightly bent when the lantern and choke are in a cool state, at typical ambient temperatures (e.g., 70 degrees Fahrenheit). The bi-metallic nature causes the choke 350 to straighten as its temperature rises to the relatively hot operating temperatures of the lantern 1. When the lantern 1 is being started or lit, the temperature of the burner tube 300 and choke 350 will typically be in the normal ambient temperature range (e.g., under 100 degrees Fahrenheit). Of course, if a lantern is re-lit shortly after being in operation, the choke 350 may be hot. After the lantern is in operation for a certain amount of time, the choke temperature rises to a high level (preferably approximately 400 degrees Fahrenheit), which causes the choke 350 to straighten. In alternate embodiments, the choke may operate with other peak temperatures. In further embodiments, structures other than a bi-metallic structure may be used to create a choke which responds to heat.

Figure 3B:
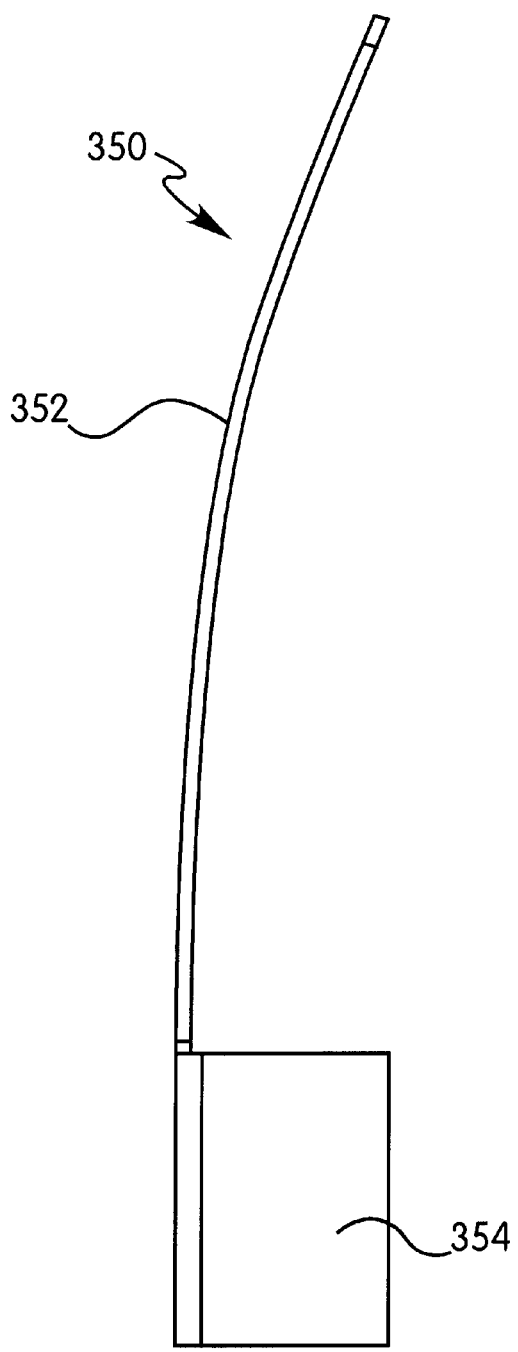
FIG. 3b illustrates the choke of FIG. 1 according to an exemplary embodiment of the present invention.
Figure 3C:
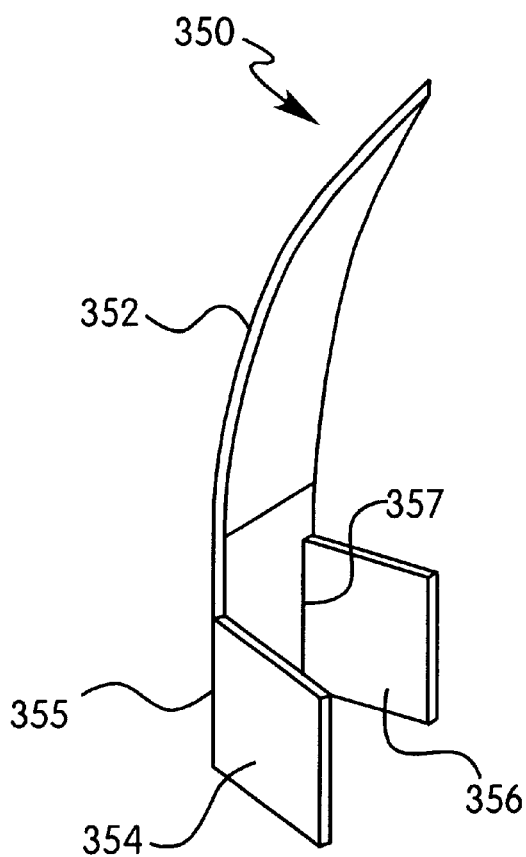
FIG. 3c illustrates the choke of FIG. 1 according to an exemplary embodiment of the present invention.

FIG. 3b illustrates the choke of FIG. 1 according to an exemplary embodiment of the present invention. Referring to FIG. 3b, the choke 350 includes a main bending portion 352, which acts to close or open the passageway through the burner tube 300 (FIG. 3a), and is held in place in the burner tube 300 by two wings 354 and 356 (not shown in FIG. 3b). Preferably the choke 350 is constructed from one sheet of bi-metallic material, and is folded and bent to fit in the burner tube 300. FIG. 3c illustrates the choke of FIG. 1 according to an exemplary embodiment of the present invention. Referring to FIG. 3c, the choke 350 includes a main bending portion 352, and wings 354 and 356. When inserted into the burner tube 300, the wings 354 and 356 are folded along seams 355 and 357 and expand with a spring so action to grip the sides of the burner tube 300 to hold the choke 350 in the burner tube 300. In an alternate embodiment the choke may be of a different structure and may be held in the burner tube in a different manner.

In operation, gas flows from the regulator assembly 100 (FIG. 1) into the burner tube 300 through the lower opening 302, through the burner tube 300, out of the upper opening 304 and into the mantle 400, where it burns to cause the mantle 400 to glow and provide light. When the burner tube 300 is relatively cold (i.e., at ambient temperature) the choke 350 is relatively bent and acts to close off a portion of the passageway of the burner tube 300. This creates a back pressure through the burner tube 300 and in the regulator assembly 100 which causes less air to enter the regulator-assembly 100 via air openings 112 and to mix with the gas being released in the regulator assembly 100. The amount of gas released by the regulator assembly 100 typically remains constant across various operating conditions. Thus the amount of gas flowing through the burner tube 300 and past the choke 350 is relatively constant, regardless of the position of the choke 350. Since the back pressure lowers the amount of air flowing through the burner tube 300 but does not significantly change the amount gas flowing through the burner tube 300, this richens the air/fuel mixture. A richer air/fuel mixture is easier to light.

After the lantern 1 has been operating for a period of time the burner tube 300 becomes relatively hot. Due to the bi-metallic nature of the choke 350, it straightens as its temperature rises. Thus the choke 350 becomes relatively straight and acts to open the passageway of the burner tube 300. In an exemplary embodiment, the choke straightens to its fullest extent to allow the burner tube to open substantially after Add approximately two minutes. Preferably, when the strip is fully heated it is substantially straight. This lowers the back pressure through the burner tube 300 and in the regulator assembly 100, and allows more air to mix with the gas. Since the amount of air flowing through the burner tube 300 increases but the amount gas flowing through the burner tube 300 remains relatively constant, this makes the air/fuel mixture leaner. A leaner air/fuel mixture is more efficient than a rich air/fuel mixture.

The choke 350 according to an exemplary embodiment of the present invention is automatic, increasing user convenience. The choke 350 is formed of one part which should not wear out over the lifetime of the lantern. That the choke 350 requires one simple part makes the choke 350 relatively inexpensive and reliable.

In an exemplary embodiment, the choke 350 is a bi-metallic strip, where one layer is nickel and one layer is iron; in alternate embodiments other metals and structures may be used. It is well known in the art to produce a bi-metallic strip which changes shape depending on its temperature. Various manufacturing methods and various compositions may be used to cause the strip to have different curvatures and to bend or straighten at different temperatures.

While the lantern of the present invention is described with respect to specific embodiments, it should be noted that the present invention may be implemented in different manners and used with different applications. For example, while the novel regulator assembly is described as being used in a lantern with flammable gas, such a regulator may be used with other applications, such as in stoves or welding devices. The regulator of the present invention may be used with any sort of gas, whether flammable or non-flammable, for example in devices such as air tanks or oxygen tanks.

What is claimed is:

1. A regulator for controlling a flow of gas, comprising:

a valve opening;

a diaphragm assembly including at least a diaphragm, the diaphragm assembly causing the valve opening to narrow in response to a flow of gas against the diaphragm;

a stem movable by a user and causing the valve opening to open or close a valve;

a surface located on the diaphragm assembly engageable by the stem to open or close the valve; and, an extension disposed on the stem; wherein the stem may be turned to cause the extension to engage the surface, and wherein the diaphragm assembly includes a fluid channel therethrough.

2. The regulator of claim 1 wherein the flow of gas exits the regulator in substantially the same direction as the flow of gas enters the regulator.

3. A regulator for controlling a flow of gas, comprising:

a valve opening;

a valve stop closing and opening the valve opening;

a diaphragm assembly including at least a diaphragm, the diaphragm assembly moving the valve stop to open and narrow the valve opening; and a stem acting to move the diaphragm assembly to cause the valve opening to narrow;

wherein gas enters the valve opening by flowing in a first direction and exits the regulator by flowing in substantially the first direction;

wherein the stem includes a first end and a second end, and wherein the diaphragm assembly includes a diaphragm neck, comprising:

a lip located on the diaphragm neck; and an extension located on the second end engaging the lip; and, wherein the extension is located axially off center with respect to the stem, and wherein the stem may be turned to cause the extension to move the diaphragm neck.

4. A regulator for controlling a flow of gas, comprising:

a valve opening;

a valve stop closing and opening the valve opening;

a diaphragm assembly including at least a diaphragm, the diaphragm assembly moving the valve stop to open and narrow the valve opening; and, a stem acting to move the diaphragm assembly to cause the valve opening to narrow; wherein the diaphragm assembly includes at least a diaphragm neck, and wherein the diaphragm neck includes a fluid channel therethrough.

5. The regulator of claim 4 wherein the stem includes a first end and a second end, comprising:

a lip located on the diaphragm neck; and an extension located on the second end of the stem engaging the lip.

* * * * *